Fig. 6.

United States Patent Office 3,502,081
Patented Mar. 24, 1970

3,502,081
CRYOSURGICAL INSTRUMENT
Selig Percy Amoils, 4 Griswold Road, Saxonwold, Johannesburg, Transvaal, Republic of South Africa
Filed Apr. 5, 1966, Ser. No. 540,274
Claims priority, application Republic of South Africa, Apr. 13, 1965, 65/1,952; June 25, 1965, 65/3,391
Int. Cl. A61b *17/36;* F25d *3/00*
U.S. Cl. 128—303.1                          24 Claims

ABSTRACT OF THE DISCLOSURE

Cryosurgical instrument utilizing the Joule-Thomson effect. A body encloses a cavity having a wall of high thermal conductivity and an exhaust passage leading from the cavity. A conduit for the flow of pressurized gas from a remote source of gas leads into the cavity through a restricted orifice. A valve stops the flow of pressurized gas simultaneously with the opening of the exhaust passage to the atmosphere. A safety relief valve, a heater for localized heating, and a thermocouple for temperature indication are also provided.

---

Advances have been made in recent years, in the techniques of cryosurgery, mainly in relation to ophthalmic surgery such as cataract extraction or retinal repair, but also in brain, intestinal or gland operations. Such techniques involve cryosurgical instruments, generally known as probes, which are used at such low temperatures as to produce local freezing of the parts to be operated upon, or to produce congelation between the probe and such a part. As can be easily appreciated, the surgeon needs for such work, instruments which can be easily and accurately controlled as to temperature, which give quick response when change of temperature is required, which afford adequate protection for tissues or parts near the site of operation, and which are able to be sterilised. Secondary practical requirements are lightness and compactness; a formation such that the surgeon can easily handle and delicately wield the instrument; the avoidance of release of unsterile gas near the site of operation, and of course, safety from bursting or failure should an excessive pressure build up.

The invention is concerned with instruments and ancillary equipment which seek to provide these attributes.

The invention basically resides in the application in cryosurgical instruments of the Joule-Thomson effect, whereby the emergence of a pressure gas below its critical temperature through a restriction results in a drop in temperature, and this assumes that both the gas, and the pressure at which it is supplied, are appropriate for the purpose. Such a gas is $CO_2$ supplied by evaporation from the liquid phase. Some gases however are inappropriate either because their Joule-Thomson characteristics are inappropriate or because they might be hazardous in an operating theatre.

The term "restricted orifice" as used herein applies to a single orifice, a porous plug, or a plurality of orifices in parallel, in each case such that when an appropriate gas is passed therethrough by an appropriate pressure difference, the Joule-Thomson effect occurs to produce a drop of temperature. It is not in accordance with the invention to effect cooling by adiabatic expansion, nor by evaporation; such effects have been proposed to be used or actually used, in cryosurgical instruments and they suffer disadvantages which the present invention avoids.

For example, one known instrument comprises a container with a probe-like conductive end, in which there was placed liquid nitrogen; evaporation of this of course involves a drop of temperature by virtue of the latent heat required, and some of this heat is supplied by conduction through the probe. This type of instrument is comparatively slow in response to control, and is physically large and heavy.

According to the invention there is provided a cryosurgical instrument comprising a body enclosing a cavity having a wall of high thermal conductivity and an exhaust passage leading from said cavity, and a conduit for pressurised gas from a remote source leading into said cavity and opening thereinto in the vicinity of said wall through a restricted orifice such as to cause cooling by the Joule-Thomson effect of the gas in escaping through said orifice into said cavity.

The invention further comprises refinements and the combination with the actual manual instrument of accessory apparatus adapted to be used with it.

The highly-conductive wall, which typically is silver, is in some cases the actual end of the body, and its external surface is suitably contoured and smooth, to suit the intended purpose. For example, an ophthalmic instrument has a tip (or wall) which is convex and highly polished. The gas flow within the wall is directed towards the wall by the restricted orifice. The body itself is, however, preferably a stainless steel tube.

The manually held part of the instrument is connected to control apparatus and thereby to the source of pressure gas, by flexible tubing and preferably this is an inner (pressure) tube, enclosed within an outer (exhaust) tube.

Steady temperature is achieved by the provision of electrical heating means which prevents build-up of solid $CO_2$ in the exhaust passageways; temperature indication is afforded by the provision of a thermocouple. Arrangements of this nature are described below.

Other features of the invention are defined by the appended claims.

The invention will be described in relation to particular examples of the instrument itself of which variants are given, and a particular example of control means to be used in combination therewith.

The first example is a retina probe which is illustrated in section as an assembly, by FIGURE 1.

FIGURE 2A is a scrap view, indicating a variation of the probe tip and showing that a plurality of restricted orifices may be used, in parallel, to cool a wall of a certain area or shape.

FIGURE 6 is a sectional view illustrating the arrangement of a supply plug, for connecting the instrument of FIGURE 1 or 2 to the unit of FIGURES 4, 5 and 6.

FIGURE 7 illustrates an alternative arrangement of restricted orifice.

FIGURE 8 illustrates an alternative arrangement of ducting.

Figure 1:
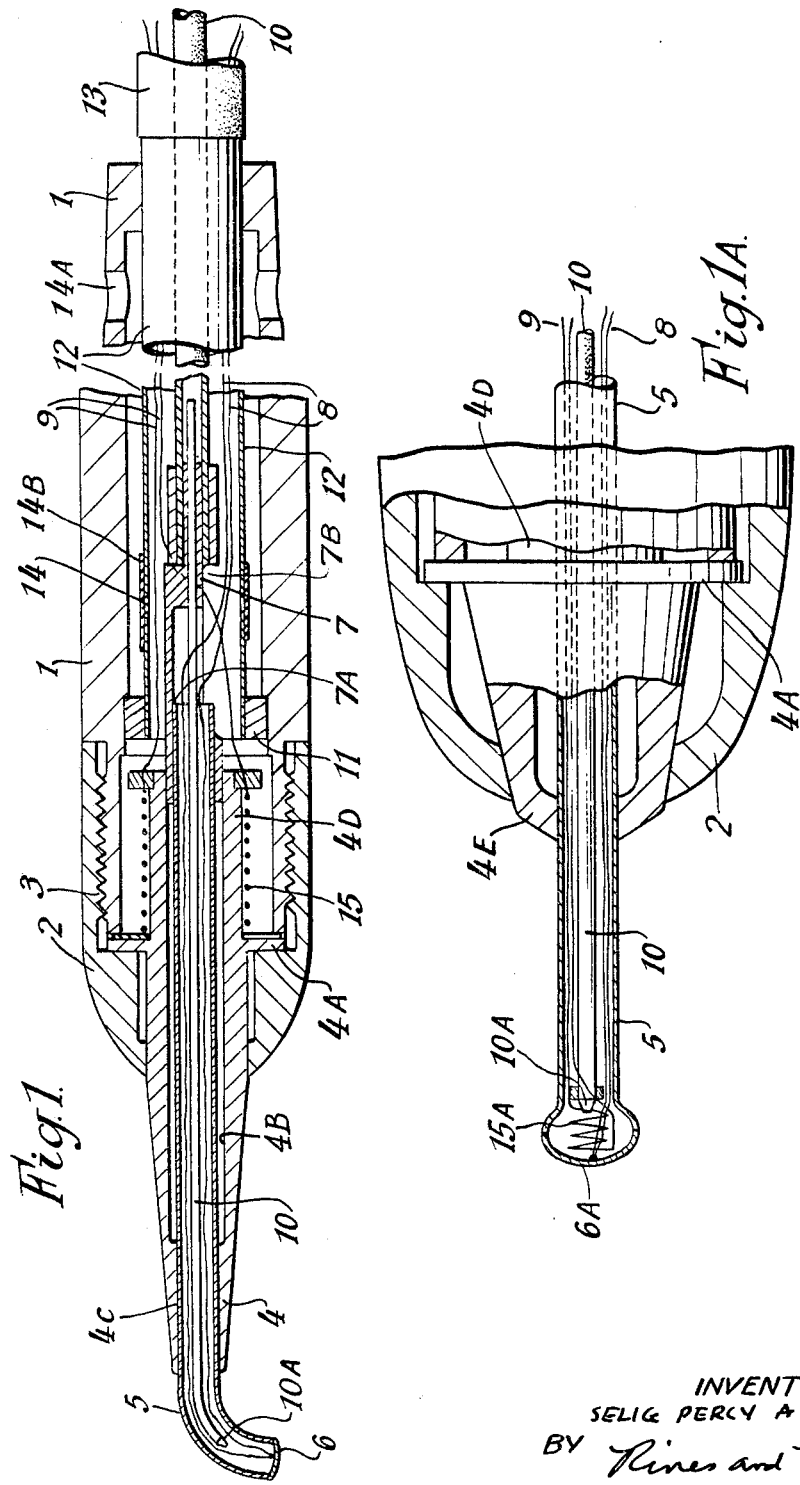
FIGURE 1A is a scrap view, indicating variation of the probe tip for cataract operations.

The first example of instrument according to the invention, in FIGURE 1, has a nylon outer protective sleeve 1 of which the shape and size may well be compared to an ordinary pocket pen, and this has a front end part 2 attached to it by screwthread at 3. When the parts 1 and 2 are firmly screwed together they nip a flange 4A of a tapered ferrule 4 which is made of silver for high thermal conductivity. The ferrule 4 has an axial bore 4B with a portion 4C of reduced internal diameter at its front end, and at its rear end within the sleeve 1 and flange 4A, a cylindrical boss 4D.

Closely fitting through the bore 4C, protruding outwardly therefrom, is the probe tip. This is (in this example) a bent stainless steel tubular body 5 of which the end is closed by the wall 6 of silver. Within the bore 4H, the body 55 is enclosed by the ferrule 4, and it extends to a short length behind the end of the part 4D. Fitting snugly in the bore 4B and extending rearwardly is a tubular cuff 7 of which the wall is cut away to form an opening at 7B. This opening 7B has two purposes; one is to allow the flow of exhaust gas from within the body 5, and the other is to afford passage for thermocouple leads 8 connected to the interior of the wall 6. The forward end of the cuff 7 is bored with an internal diameter such as to fit around the rear end of the body 5, and the rear end of the cuff is bored to fit around the outside of a conduit 10. The conduit 10 is a stainless steel tube of capillary-bore proportions, say about .06 cm. diameter, which extends into and through the bore 4B and into the cavity formed immediately inside the wall 6. At this end of the conduit 10 it terminates at a restricted orifice of 10A, say, 0.01 or 0.015 cm. which aims emerging gas at the wall 6, from which it is spaced by, say 0.2 cm. These figures, given as examples, assume that the pressure gas is $CO_2$ at about 56,000 gms./sq. cm. Where the conduit 10 passes through the rear end bore of the cuff 7 it is soldered. As a matter of adjustment during assembly, the cuff 7 is slid along the body 5 until the orifice at 10A of the conduit 10 is correctly spaced from the wall 6 and when properly located, a local weld is made at 7A securing the cuff 7 to the body 5.

We have seen that exhaust gas, returning from the end of the probe along the bore 4B, escapes by the opening 7B. Force-fitted into the sleeve 1 at 11 is a ring into which is soldered the forward end of an exhaust tube 12 which extends through the sleeve 1 and emerges from the rear end thereof, where it is connected to a flexible exhaust pipe 13. Near the forward end of the exhaust tube 12 is a ring of holes 14 surrounded and normally closed by an elastic sleeve 14B. Thus there is provided a safety valve; if for any reason the exhaust gas pressure builds up unduly within the tube 12 or pipe 13, the gas can escape by the holes 14 into the sleeve 1 and thus to atmosphere via a hole 14A in the wall of the sleeve 1. Such an escape valve makes a characteristic noise, so the surgeon is informed that there is a blockage of the exhaust flow. The thermocouple leads 8 are passed through the tube 12 and pipe 13.

Around the boss 4D is a heater winding of suitable and suitably insulated wire 15, the supply leads 9 of which are likewise led back through 12 and 13.

The main object of providing the ferrule 4 is to enable the body 5 and in turn the forward end of the conduit 10 to receive heat. By controlling the current in the heater winding 15 the temperature within the cavity of the tip, and therefore of the wall 6, can be maintained within sufficiently precise limits. General control from one (upper) extreme of temperature range (i.e. the ambient temperature) to the lower extreme of, say, −78° C. is effected simply by turning the gas supply on and off, and the more accurate control so as to "hold" the wall 6 at (say) −60° C. for retinal surgery, although it may be accomplished by current control, is preferably regulated empirically by always applying the same experimentally determined voltage. It may here be mentioned that the controlled temperature for retinal operations is considerably lower than for cataract work, the latter usually being done at about −30° C. (the instrument being that to be described referring to FIGURE 1A).

The cooling is achieved entirely by the Joule-Thomson effect of the restricted orifice at 10A. It is to be observed that the bore within the conduit 10 being much larger than that of the orifice at 10A, the gas within the conduit flows at an insignificant velocity, so that no appreciable Joule-Thomson effect or adiabatic cooling effect, occurs within the conduit. The conduit 10 is extended back to its point of supply by running, as a flexible pipe, within the pipe 13. Being of small bore and at normal temperatures, it can well be of plastic or other sterilisable material, despite carrying a high internal pressure. It is, however, a useful safety factor that if the pressure pipe should leak or burst, it is enclosed within the pipe 13 which is, effectively, open to atmosphere.

The instrument of FIGURE 1 is, as stated, adapted for retinal operations. This is another reason for heating the ferrule 4. Whilst the bend at the end of the body 5 of the probe is provided to facilitate reaching the back of the eye, there is a risk that the probe tip might touch and congeal, or congellae with, the eyelid; the ferrule being kept warm, minimises or avoids consequent risks.

Turning now to FIGURE 1A, it may be assumed that the main part of the instrument is the same as in FIGURE 1. In this case, however, the probe tip is for cataract extraction, and it is straight, as shown, and there is no requirement for eyelid protection so the ferrule, the exposed end of which is indicated at 4E, extends less from the end 2 of the outer sleeve. The actual tip of the probe is a somewhat enlarged "bead" as indicated at 6A, this being of silver brazed to the tubular body 5.

Figure 2:
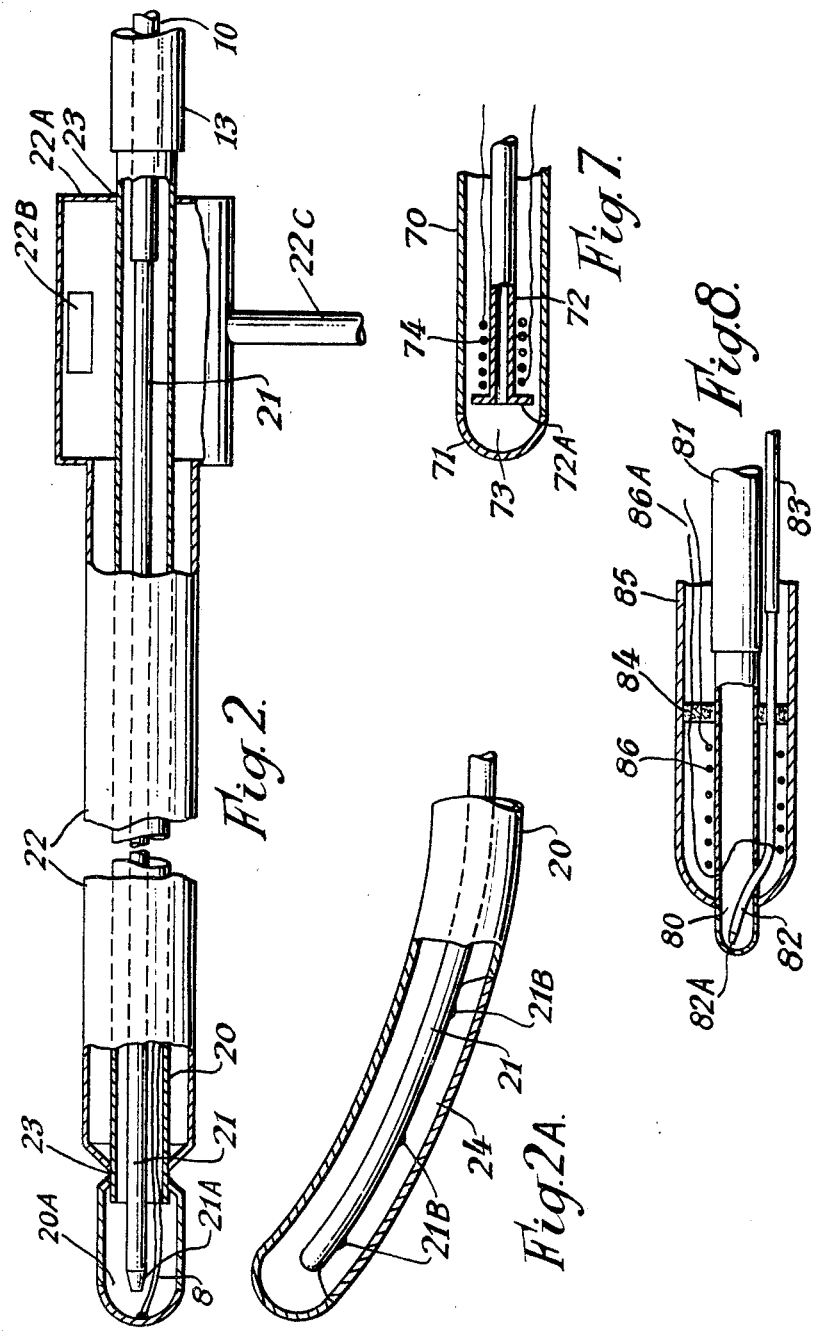
FIGURE 2 illustrates schematically an instrument for brain, ear, nose and throat, or intestinal cryosurgery.

In this case, and if required in the example of FIGURE 1 or FIGURE 2, there may be a different way of controlling temperature instead of or additional to the heater 15. This is in the form of an open coil of heater wire indicated at 15A, in the gas flow which has emerged from the restricted orifice at 10A. Such a coil is supplied by leads which, with the thermocouple leads 8, are led between the conduit 10 and body 5.

FIGURE 2 illustrates by way of simplified view an arrangement of an instrument according to the invention, arranged for such surgical purposes as brain, E.N.T. (ear, nose and throat) or prostate or similar internal purposes. The illustration is only intended to be schematic, and the instrument will in practice probably be designed, especially as to shape, for its particular task.

In the FIGURE 2 example the body is shown generally at 20, and its tip or forward end encloses a cavity at 20A the wall of which is of high thermal conductivity such as silver or silvered copper. The body 20 exhausts to the outer flexible pipe 13 as in FIGURE 1. Within the body 20 and practically coextensive with it is the pressure conduit 21 supplied by the flexible pipe 10 lying within the pipe 13. The conduit 21 terminates, within the cavity 20A, at 21A where there is the restricted orifice to afford the Joule-Thomson effect.

The internal arrangements are similar to those of FIGURE 1 or FIGURE 1A and are therefore not repetitively described. In this case however, special measures are required for thermal insulation of the instrument. It is proposed therefore, to surround the body 20 (leaving exposed the tip portion by a hollow sleeve 22 which is hermetically attached to the body 20 at each end, as at 23. This sleeve 22, which is of stainless steel, is highly evacuated, and its interior as well as the exterior of the body 20, may be polished to reduce radiation. The sleeve 22 may have an enlarged portion as at 22A in which may be located a getter indicated at 22B appropriate to whatever gas is used in the vacuumising and a vacuum-pump connection 22C may be provided. The sleeve 22 thus thermally insulates the body 20 from the patient and of course the surgeon's hand. To give an idea of dimensions, the overall length of the instrument is say 20 cm. and the outside diameter of the forward end of the body (at 20A) is 2–3 mm.

FIGURE 2A is an example of a variation of the instrument of FIGURE 2, and is consequently simply a fragmentary view of the tip portion, generally speaking equivalent to the cavity portion 20A. The instrument in question is a tonsilectom, and its body 20 is forwardly extended in a bend, as shown in the figure, within which is contained the forward end of the conduit 21. In this, case, the conduit has three restricted orifices, the locations of which are shown at 21B, and these are aimed at a wall portion 24 made of silver, brazed into an aperture formed in the convex side of the bend of the body. The portion 24 is, therefore, so contoured and located that the surgeon can contact it with the tonsil, and by the very low temperature (say −60/65° C.) reached by the wall 24 and its high conductivity, the tonsil is frozen, and is either removed in its frozen state by section or is left "dead," to be absorbed over a period of time by the natural bodily processes.

Figure 3:
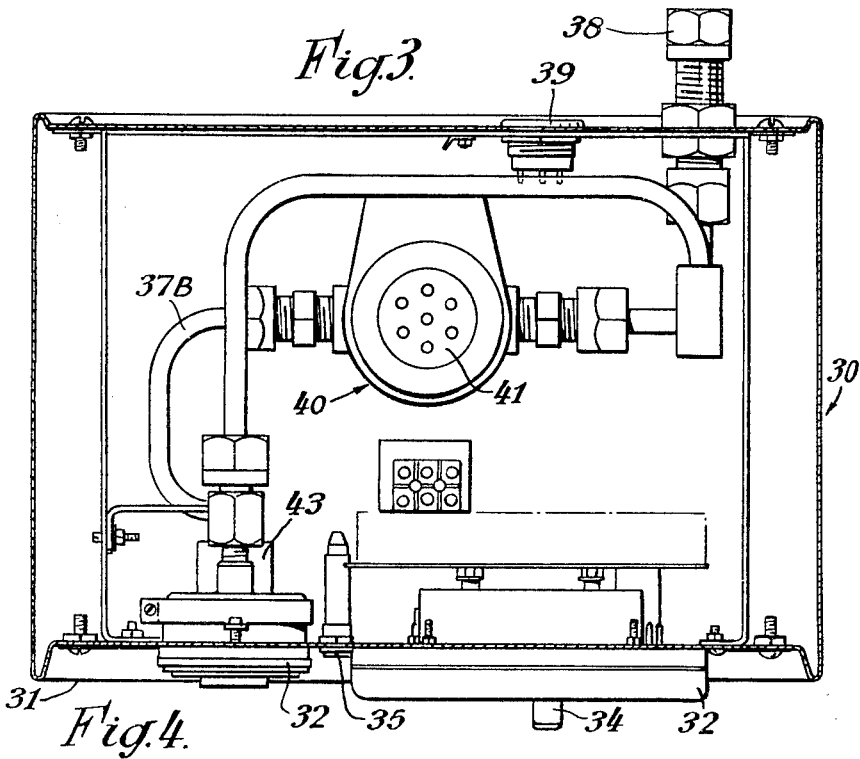
FIGURES 3, 4 and 5 are respectively a plan, front elevation, and side elevation showing the arrangement of a control unit for use in combination with the instrument of FIGURE 1 or 2.
Figure 4:
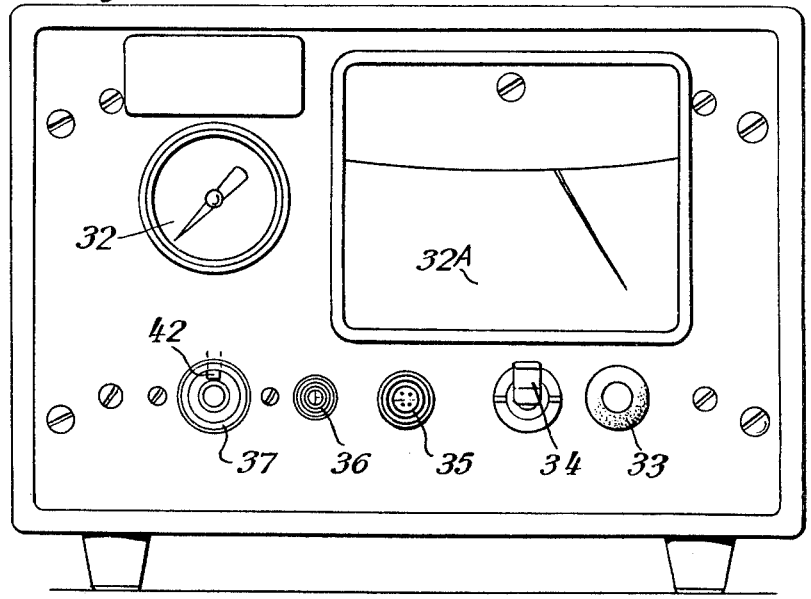
Figure 5:
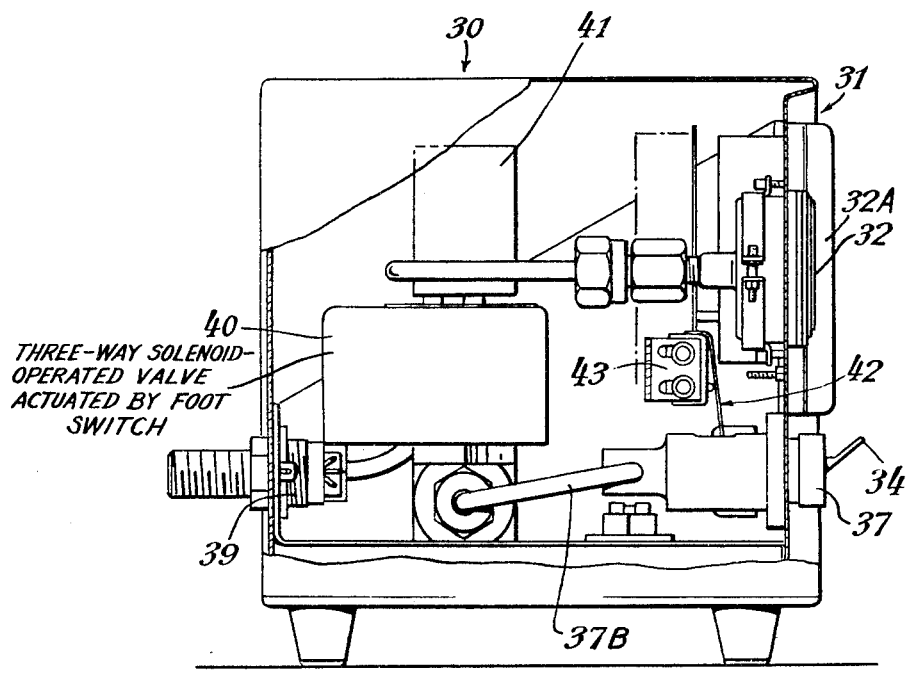

The instruments described above present certain practical problems, in the technique of their use, as to indication, control and supply. There is consequently provided a unit accessory to the manual intrument, which unit is adapted to provide the required services. It is illustrated in FIGURES 3, 4 and 5.

A cabinet or box generally indicated at 30 has a front wall or panel 31 on which are arranged a pressure gauge 32 to show the supply pressure of the gas (in the case preferred liquid $CO_2$ is the source, and the pressure shown will therefore remain substantially constant so long as there is liquid in the reservoir); and a temperature indicator 32A responding to the thermocouple of the instrument. In the panel 31 are also an indicator lamp 33 to indicate that the electrical supply is "on," a master switch 34 to control the apparatus generally, a socket 35 to connect the surgeon's foot-switch, a socket 36 to connect the thermocouple and heating leads, and a gas-connection socket 37, to be enlarged upon below.

On the back wall of the cabinet 30 is a union 38 for the connection of a gas supply from the gas reservoir. Also on the back wall is a socket 39 for plug-in connection of electrical main supply.

Within the cabinet, as well as fixed piping which is conventional and visible in the drawings, there is a three-way valve indicated at 40, which is electrically operated by solenoid under the control of the surgeon's foot. This valve and its solenoid operation are well-known; the valve either cuts off the source of gas supply simultaneously opening the pressure pipe 10 to atmosphere through a silencer 41, or communicates the source of gas supply to the pipe 10 and so to the instrument. The foot-switch is, therefore, a simple alternative-position pedal switch and it is laid on the floor convenient to the surgeon, as may also be the cabinet 30.

Into the socket 37 there protrudes a leaf-spring lever 42 which is the operative lever of a microswitch 43, which in the "off" position, i.e. when the gas plug (later described) is not fully engaged, cuts off the solenoid and so prevents inadvertant release of gas.

Temperature control of the instrument by its heaters may be fixed, so that it is simply on an "on-off" basis according to whether pressure gas is supplied or not; or there may be introduced an electrical control e.g., a resistance or variable transformer, to enable the surgeon to vary the probe temperature at his momentary will.

Figure 6:
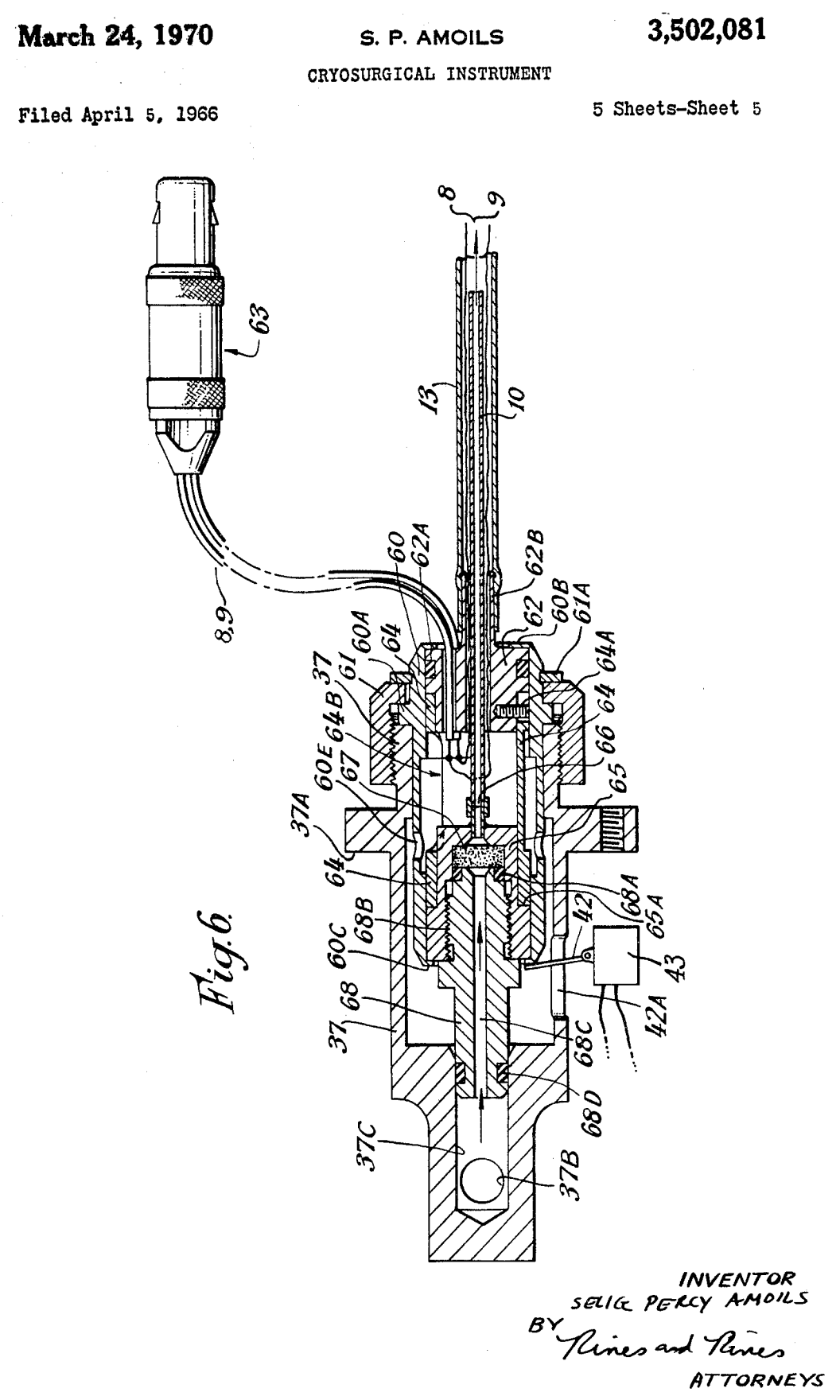

The socket 37 is designed to cooperate with a plug constructed as shown by FIGURE 6. In this, the socket is seen at 37 as a substantially cylindrical hollow body with a flange 37A to secure it to the panel 31, and a gas supply pipe 37B leads into the socket.

The plug of FIGURE 6 fulfills three main purposes; it serves to connect the pressure pipe 10 and exhaust pipe 13 to the control unit; to bring down conveniently the electrical connections (thermocouple and heating) from the instrument; and to operate the microswitch 43.

The plug consists essentially of a hollow cylindrical portion 60, the outer end of which presents a flange 60A against which bears an annular nut 61 screwing on to a thread formed on the outside of the socket 37. The nut is rotatably retained on the portion 60 by a sprung-on ring 61A. Within the portion 60 there is an end plug 62 sealed by resilient packing 62A and retained in the portion 60 by the end of the latter being spun over as at 60B. The plug 62 has a spigot extension 62B on to which is fitted the end of the exhaust pipe 13, and there is an axial bore through which passes, with adequate clearance, the pressure pipe 10, and the leads 7 and 9 (of which for clarity only two are shown, though their total will be four). Also through the plug 62 is a second passage through which the leads 7, 9 pass outwards again to a four-point electrical plug 63 (to fit socket 36 of FIGURE 4) via suitable flex wire.

Within the plug 62 and holding it against the spun rim 60B is an internal sleeve 64 locked to the plug 62 against rotation by a grub screw 64A. In the wall of the sleeve 64 is an opening 64B. The inner end of the sleeve 64 bears against a shoulder 65A formed on a hollow cylindrical thimble 65 through the end of which passes and is secured a length of pressure duct 66 to which the pipe 10 is connected. Within the end of the thimble 65 is provided a filter pad 67 and this is held by the end of the main gas spigot 68, packed at 68A and secured by screw thread 68B in the thimble 65. In turn the thimble 65 is secured in the portion 60 by the latter being spun over as at 60C, and a flange 68B on the spigot 68, bears against the inner end of the thimble 65. The spigot 68 is axially bored (at 68C) for the passage of gas to the filter 67. The inner end of the spigot 68 is provided with a packing at 68B to fit gas-tightly into an inner bore 37C of the socket 37. The lever 42 of the microswitch 43 extends through an opening 42A made in the wall of the socket element; it is so positioned that the end at 60C contacts and moves it when the plug assembly is properly and sufficiently inserted in the socket, so that only then are the electrical circuits made for the operation of the instrument.

Exhaust gas returning via 13 flows through the opening 64A in the sleeve 64, a port 60E in the wall of the portion 60, and this escapes through 42A into the interior of the control cabinet where it is harmlessly dispersed, though it may well purge the inside of the cabinet with $CO_2$ and thus minimise any theatre risks due to sparking within the cabinet, as also the gas relieved through the silencer 41 tends to purge the cabinet of any gas other than $CO_2$.

In FIGURE 7 is illustrated by way of section scrap view an alternative arrangement of the restricted orifice, by which the pressure gas flows in an outer pressure pipe or body 70 of stainless steel having a silver end wall 71. Within the body there is enclosed an exhaust passage in the form of a pipe 72 which has at its end an external flange 72A and between the periphery of the flange 72A and the internal surface of the body 70 is a very small clearance, or a series of clearances formed by irregularity of the flange, constituting the restricted orifice, through which pressure gas supplied into the body 70 emerges into the cavity 73 and cools, exhausting back through the pipe 72. In this case, the body 70 and whatever supply pipe is used to connect it with the source of gas, must of course be robust enough to contain the gas pressure; and the pipe 72 must not be such as to collapse under the pressure.

An advantage of this arrangement is that regenerative cooling (i.e. cooling of the supplied pressure gas by the cold exhaust gas) is minimised and such regenerative cooling is not desirable in the case of $CO_2$. A heater wire may be provided in the flow of supply gas within the body 72, as at 74, if required. The area of the orifice may be set by carefully setting the axial position of the flange 72A in relation to the slightly convergent internal profile of the body 70 or wall 71.

In the variant of FIGURE 8, it can be seen that the body 80 connected by the flexible exhaust pipe 81, is entered nearly at its forward end by the conduit 82 which is supplied with pressure gas by the flexible pipe 83. The pipes 81 and 83 may be clipped or bound together to keep them compact. The conduit 82 opens into cavity of the body 80, by the restricted orifice at 82A which is aimed at the silver end-wall of the body. The body 80 and conduit 82 are, conveniently, clipped together by a plastic ring as at 84, the whole being bound in a plastic outer sleeve 85. A heater coil 86 is preferably located around both the body 80 and duct 82, towards the forward end of that assembly; leads 86A, passing through the ring 84 supply the heater coil. This variant has certain advantages; it is basically easier and cheaper to make than the previously described examples in which the tubes are more or less coaxial, and also there can be but little regenerative effect because the heat-exchange between exhaust and supply is very limited, and in any case the coil 86 can directly put heat into the supply as well as keeping up the temperature of the exhaust-passing part of the body.

I claim:

1. A cryosurgical instrument for use with a remote source of pressurized gas, comprising a body enclosing a cavity having a wall of high thermal conductivity and an exhaust passage leading from said cavity, a conduit for the flow of pressurized gas connected to said remote source of gas and leading into said cavity through an opening thereinto in the vicinity of said wall, said opening being a restricted orifice having a dimension in the direction of gas flow which is much smaller than the corresponding dimension of said cavity and having cross-dimensions substantially smaller than the cross-dimensions of said conduit such as to cause cooling by the Joule-Thomson effect of the gas in escaping through said orifice into said cavity, said wall being spaced from said orifice, closely adjacent thereto, with unobstructed free space therebetween and being positioned to receive directly the impingement of cooled gas escaping from said orifice.

2. An instrument according to claim 1, in which the exteriorly exposed surface of the said wall is contoured and of such surface as to serve as a cryosurgical probe.

3. An instrument according to claim 2, in which the said body is a tube of stainless steel and its end is closed by the said wall which is of silver.

4. A cryosurgical instrument for use with a source of pressurized gas, comprising a ducted body enclosing a cavity having a wall of high thermal conductivity, and a conduit extending through the duct thereof into said cavity, connected to said source, and having a restricted orifice communicating with said cavity for the emergence and consequent cooling of pressurized gas from the conduit into the cavity, said orifice having cross-dimensions substantially smaller than the cross-dimensions of said conduit such as to cause cooling by the Joule-Thomson effect of the gas in escaping through said orifice into said cavity, said wall being spaced from said orifice, closely adjacent thereto, with unobstructed free space therebetween and being positioned to receive directly the impingement of cooled gas escaping from said orifice.

5. An instrument according to claim 4, in which said body comprises an outer tubular element enclosing the duct and cavity, and the conduit comprises a tube being terminated by said restricted orifice which is at the end of the tube, within the cavity.

6. A cryosurgical instrument for use with a source of pressurized gas, comprising an elongated tubular metal body with its bore closed at one end by a wall of highly conductive metal, flexible exhaust tubing connecting said bore to atmosphere, a conduit in the form of a metal pipe of less external diameter than the diameter of the said bore lying within the bore and nearly reaching the said wall, flexible pressure tubing connected to said conduit and said source to supply pressure gas to said conduit, and a restricted orifice for emergence of such gas from the conduit into the bore so as to cool the wall, said orifice having cross-dimensions substantially smaller than the cross-dimensions of said conduit such as to cause cooling by the Joule-Thomson effect of the gas in escaping through said orifice, said wall being spaced from said orifice, closely adjacent thereto with unobstructed free space therebetween and being positioned to receive directly the impingement of cooled gas escaping from said orifice.

7. An instrument according to claim 6, in which said pressure tubing is enclosed with radial clearance throughout virtually all its length within said exhaust tubing.

8. An instrument according to claim 6, combined with valve means to control the supply of pressure gas from said source into said flexible conduit and alternatively to stop such supply whilst simultaneously relieving said flexible conduit of gas.

9. A cryosurgical instrument for use with a source of pressurized gas, comprising a rigid conduit for pressure gas with a restricted orifice such as to cause a drop in temperature by Joule-Thomson effect in gas emerging therefrom, said orifice having cross-dimensions substantially smaller than the cross-dimensions of said conduit, an inner flexible conduit connected to supply pressure gas from said source of gas to said rigid conduit, valve means to control flow of pressure gas from said source into said flexible conduit and to stop such flow, simultaneously opening said flexible conduit to atmosphere, an elongated rigid hollow metal body housing said rigid conduit with clearance for the exhausting of gas after its emergence from the orifice and having a wall of high thermal conductivity spaced from said orifice and responsive in temperature to the emergent gas, said wall being positioned to receive directly the impingement of cooled gas escaping from said orifice, and an outer flexible conduit surrounding said inner conduit to conduct said gas to an outlet to atmosphere remote from the vicinity of said wall.

10. An instrument according to claim 9, further comprising means for locally electrically supplying heat to the interior of the metal body.

11. An instrument according to claim 10, in which said heat-supplying means supplies heat to the exterior of the metal body in such locality as to minimise the risk of said body by contact adversely cooling the skin or other tissues of the patient in the course of surgical use of the instrument.

12. An instrument according to claim 10, further comprising wire run within the interior of the ducting of the instrument to connect said heating means to a source of electrical supply.

13. An instrument according to claim 1, further comprising a thermocouple located so as to give an indication of the temperature of the said wall.

14. An instrument according to claim 13, in which leads from the thermocouple are run within the interior of the ducting of the instrument.

15. An instrument according to claim 1, in which valve means for controlling the supply of pressure gas to the instrument are arranged to be accessible to the surgeon using the instrument at a control unit to which the instrument is connected by conduit and by electrical supply lead, and to which the source of pressure gas is connectible.

16. An instrument according to claim 1, having an outer gastight sleeve covering the length, except the useful tip, of the body which sleeve is evacuated to afford thermal insulation.

17. An instrument according to claim 1, in which the control unit is adapted to be located for operation by the user's foot.

18. An instrument according to claim 9, having towards its useful tip an outer sleeve locally enclosing the body made of metal of high thermal conductivity, and an electrical heating element adapted to put heat into said body.

19. An instrument such as a tonsilectome according to claim 9, comprising two or more restricted orifices directed towards corresponding wall areas for simultaneous cryogenic effect distibuted over a corresponding operative area.

20. A cryosurgical instrument comprising a rigid conduit for pressure gas with a restricted orifice such as to cause a drop in temperature by Joule-Thomson effect in gas emerging therefrom, said orifice having cross-dimensions substantially smaller than the cross-dimensions of said conduit, an inner flexible conduit to supply pressure gas from a source of gas to said rigid conduit, valve means to control flow of pressure gas from such source into said flexible conduit and to stop such flow, simultaneously opening said flexible conduit to atmosphere, an elongated rigid hollow metal body housing said rigid conduit with clearance for the exhausting of gas after its emergence from the orifice and having a wall or high thermal conductivity responsive in temperature to the emergent gas, an outer flexible conduit surrounding said inner conduit to conduct gas to atmosphere remote from the vicinity of said wall, and means for locally electrically supplying heat to the interior of the metal body, said heat supplying means comprising an electric heater element provided in, and so as to supply heat to, the gas which has been cooled by the effect of the restricted orifice.

21. A cryosurgical instrument comprising a rigid conduit for pressure gas with a restricted orifice such as to cause a drop in temperature by Joule-Thomson effect in gas emerging therefrom, said orifice having cross-dimensions of said conduit, an inner flexible conduit to supply pressure gas from a source of gas to said rigid conduit, valve means to control flow of pressure gas from such source into said flexible conduit and to stop flow, simultaneously opening said flexible conduit to atmosphere, an elongated rigid hollow metal body housing said rigid conduit with clearance for the exhausting of gas after its emergence from the orifice and having a wall of high thermal conductivity responsive in temperature to the emergent gas, an outer flexible conduit surrounding said inner conduit to conduct said gas to an outlet to atmosphere remote from the vicinity of said wall, and safety valving means including an aperture through the wall of the body, an elastomeric sleeve fitting closely around the body normally closing said aperture and yieldable for the escape of gas from the body if the pressure difference between the interior of the body and atmosphere exceeds an approximately selected limit.

22. An instrument according to claim 21, in which said wall has a smooth convex exterior and a smooth concave interior and in which said source of gas is a source of carbon dioxide.

23. The instrument of claim 22, in which the thickness of said wall is not substantially greater than the remaining walls of said cavity.

24. An instrument according to claim 8, in which the valve means for controlling the supply of pressure gas is a three way valve operated by solenoid.

References Cited

UNITED STATES PATENTS

| | | | |
|---|---|---|---|
| 2,909,908 | 10/1959 | Pastohov et al. | 62—514 |
| 3,298,371 | 1/1967 | Lee | 128—303.1 |
| 3,393,679 | 7/1968 | Crump et al. | 128—303.1 |
| 3,398,738 | 8/1968 | Lamp et al. | 128—303.1 |
| 3,351,063 | 11/1967 | Malaker et al. | 128—303.1 |
| 3,001,288 | 9/1961 | Freedman | 32—69 |
| 3,220,414 | 11/1965 | Johnston | 128—400 |
| 3,270,744 | 9/1966 | Katz | 128—303.1 |
| 3,272,203 | 9/1966 | Chazo | 128—303.1 |
| 3,289,424 | 12/1966 | Shepherd | 62—55 |

L. W. TRAPP, Primary Examiner

U.S. Cl. X.R.

62—293